US011273742B2

(12) United States Patent
Ohtsu et al.

(10) Patent No.: US 11,273,742 B2
(45) Date of Patent: Mar. 15, 2022

(54) VEHICLE SEAT

(71) Applicant: TOYOTA BOSHOKU KABUSHIKI KAISHA, Aichi-ken (JP)

(72) Inventors: Hideki Ohtsu, Aichi-ken (JP); Yuya Ota, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 169 days.

(21) Appl. No.: 16/433,556

(22) Filed: Jun. 6, 2019

(65) Prior Publication Data
US 2019/0375320 A1  Dec. 12, 2019

(30) Foreign Application Priority Data

Jun. 8, 2018  (JP) .............................. JP2018-110492

(51) Int. Cl.
B60N 2/58 (2006.01)
B60N 2/70 (2006.01)
B63B 29/04 (2006.01)
B61D 33/00 (2006.01)
B64D 11/06 (2006.01)

(52) U.S. Cl.
CPC ............. B60N 2/5883 (2013.01); B60N 2/70 (2013.01); B61D 33/0035 (2013.01); B63B 2029/043 (2013.01); B64D 11/0647 (2014.12)

(58) Field of Classification Search
CPC .................................................. B60N 2/5883
See application file for complete search history.

(56) References Cited

U.S. PATENT DOCUMENTS

| 6,886,479 | B1* | 5/2005 | Hori ..................... | B60N 2/5883 |
| | | | | 112/470.27 |
| 2010/0127487 | A1* | 5/2010 | Kamo ................... | B60R 21/207 |
| | | | | 280/743.1 |
| 2017/0114485 | A1* | 4/2017 | Yoshizawa ............... | D05B 3/00 |
| 2018/0037145 | A1* | 2/2018 | Moroi .................. | B60N 2/5825 |
| 2019/0009698 | A1* | 1/2019 | Ohtsu .................. | B60N 2/5883 |
| 2019/0111814 | A1* | 4/2019 | Kamata ................ | B60N 2/5883 |
| 2019/0143860 | A1* | 5/2019 | Ohtsu .................. | B60N 2/5891 |
| | | | | 297/452.58 |

(Continued)

FOREIGN PATENT DOCUMENTS

| DE | 10026337 C1 * | 8/2001 | ........... B60N 2/5883 |
| DE | 102017211246 A1 * | 1/2019 | ............. B60Q 3/233 |

(Continued)

Primary Examiner — Timothy J Brindley
(74) Attorney, Agent, or Firm — Greenblum & Bernstein, P.L.C.

(57) ABSTRACT

The present disclosure relates to a vehicle seat having a seat pad and a planar seat cover. The seat cover may include a plurality of the skin materials and at least one seam allowance formed by sewing the adjacent skin materials each other. The seam allowance includes end portions of the adjacent skin materials projecting from a back surface of the seat cover. The seat pad may include a plurality of recessed grooves and an intersecting area of the grooves. The skin material may include a high-rigidity portion disposed at the intersecting area and configured to cover at least one of the corners formed at the intersecting area. The high-rigidity portion may include a planer overlapping portion laid over a back surface of the skin material.

14 Claims, 12 Drawing Sheets

(56) References Cited

U.S. PATENT DOCUMENTS

| | | | |
|---|---|---|---|
| 2019/0176665 A1* | 6/2019 | Inoue | B60N 2/5883 |
| 2019/0225124 A1* | 7/2019 | Ushiyama | B60N 2/5825 |
| 2019/0329684 A1* | 10/2019 | Lombardi | B60N 2/5816 |
| 2019/0359099 A1* | 11/2019 | Lorenzi | B60N 2/5883 |
| 2020/0046137 A1* | 2/2020 | Ohtsu | B60N 2/5816 |
| 2020/0247288 A1* | 8/2020 | Ishii | B60N 2/5883 |

FOREIGN PATENT DOCUMENTS

| | | | | |
|---|---|---|---|---|
| EP | 2703211 A1 | * | 3/2014 | ............... B60N 2/80 |
| FR | 2983112 A1 | * | 5/2013 | ............ B29C 44/351 |
| FR | 3037012 B1 | * | 6/2017 | ............ B60N 2/5891 |
| JP | 2016155400 A | * | 9/2016 | ............ B60N 2/6009 |
| JP | 6184994 | | 8/2017 | |
| JP | 2017140185 A | * | 8/2017 | ............ B60N 2/5883 |
| WO | WO-2014003143 A1 | * | 1/2014 | ............ B60N 2/5875 |
| WO | WO-2017051466 A1 | * | 3/2017 | ............ B60N 2/5883 |

\* cited by examiner

VEHICLE SEAT

CROSS-REFERENCE TO RELATED APPLICATIONS

This application claims priority to Japanese patent application serial number 2018-110492 filed Jun. 8, 2018, the contents of which is incorporated herein by reference in its entirety for all purposes.

BACKGROUND

The present invention relates to a vehicle seat having a seat pad and a seat cover for covering the seat pad. The seat cover is formed by sewing to join a plurality of skin materials to each other. Joining portions with adjacent seam allowances may be arranged in grooves formed on the seat pad in an intersecting manner.

One type of a vehicle seat includes a seat pad for elastically supporting a passenger and a planar seat cover that covers the seat pad. This seat cover provides an aesthetically pleasing surface for the seat. For example a seat cover may be formed by sewing a plurality of skin materials each other. Adjacent skin materials are sewed together and folded over so that the stitches are located on the inside. The area of the skin material between the seam and the edge of the skin material is often referred to as a seam allowance. The seam allowance may be arranged to project to the rear side of the seat cover. The seam allowances are typically laid flat along a surface of the seat pad or arranged in recessed grooves of the seat pad, so as to improve the appearance of the seat cover.

In the above seat structure, a plurality of the skin materials may be sewed together in an intersecting manner (for example, in a cross-shape or T-shape). The seam allowances may then be positioned in similarly shaped grooves in the seat pad. That is, the grooves in the seat pad may also be formed in an intersecting manner. The area of the seat pad in which grooves intersect tends to be relatively large. This may deteriorate an appearance of the seat cover covering the area. More specifically, since a large portion of the seat pad is removed in the area with intersecting grooves, the seat cover will not be supported in the area and wrinkles may form as the seat cover is bent in a recessed shape. Further, the formation of the grooves results in corners in the seat pad, which are especially pronounced at the intersection of the grooves. These corners may be relatively easily deformed and are inferior in their rigidity (e.g., supporting performance) when compared to the rest of the seat pad. Therefore, when a pressing force is applied to the seat cover, these corners easily deformed, which could cause wrinkles in the seat cover. As there are more corners in the seat pad where the grooves intersect, wrinkling of the seat cover is especially pronounced in the groove intersecting area.

SUMMARY

According to one aspect of the present disclosure, a vehicle seat may include a seat pad forming an outer contour of the seat and a planar seat cover configured to cover the seat pad. The seat cover includes a plurality of the skin materials and at least one seam allowance formed by sewing the adjacent skin materials each other. The seam allowance may include end portions of the adjacent skin materials. The end portions project from a back surface of the seat cover and may face each other. The seat pad includes a plurality of recessed grooves in which the seam allowance is disposed, an intersecting area where the plurality of the grooves are intersecting, and corners defined at the intersecting area. The skin material includes a high-rigidity portion disposed at the intersecting area and configured to cover at least one of the corners. The high-rigidity portion includes a planer overlapping portion laid over the back surface of the skin material.

Since the high-rigidity portion includes an overlapping portion, the high-rigidity portion has a higher rigidity than other areas of the seat cover. The high-rigidity portion covers at least one of the corner at the intersecting area of the grooves. With this structure, the high-rigidity portion may assist with compensating for area of the seat pad having insufficient strength for adequately supporting the seat cover. It is therefore possible in some embodiments to prevent this area of the seat cover from being recessed into the intersecting area, which improvise the appearance of the seat cover.

According to another aspect of the present disclosure, the overlapping portion may extend from an edge of the skin material. The overlapping portion and the skin material may be formed of an integral sheet-like member. Since the skin material and overlapping portion are formed of an integral sheet-like member in this embodiment, the structure of the seat cover is simpler than the case where the skin material and the overlapping portion are provided as separate members. Further, it is possible to eliminate a connection between the skin material and the overlapping portion.

According to another aspect of the present disclosure, the seat cover includes a base line connecting the edge of the skin material and the overlapping portion. The base line is configured to allow the overlapping portion to be folded onto the skin material. Therefore, the skin material and the overlapping portion are laid one over the other by folding the overlapping portion at the base line. As a result, an embodiment of a high-rigidity portion may be formed.

According to another aspect of the present disclosure, the base line includes a slot and at least one bridge portion. The slot may linearly extend along a border between the skin material and the overlapping portion. The bridge portion may be located at one end of the slot and may be configured to connect the skin material and the overlapping portion. Therefore, the slot may weaken the base line such that the sheet-like member may easily be folded. The base line may include at least one bridge portion. Therefore, the bridge portion can allow the sheet-like member to be folded in an appropriate position and with an appropriate and alignment.

DETAILED DESCRIPTION

Hereinafter, exemplary embodiments for carrying out the present invention will be described with reference to FIGS. 1 to 17. Arrows for indicating a front-rear direction, right-left direction, and an up-down direction of the vehicle seat are illustrated in each of the figures to aid explanation. Further, the arrows for indicating the front-rear direction, the right-left direction, and the up-down direction are appropriately illustrated in FIGS. 4 to 15 with reference to a state in which the seat cover or the skin materials is/are disposed on the vehicle seat. These axes are not intended to limit the scope of the invention.

Figure 1:
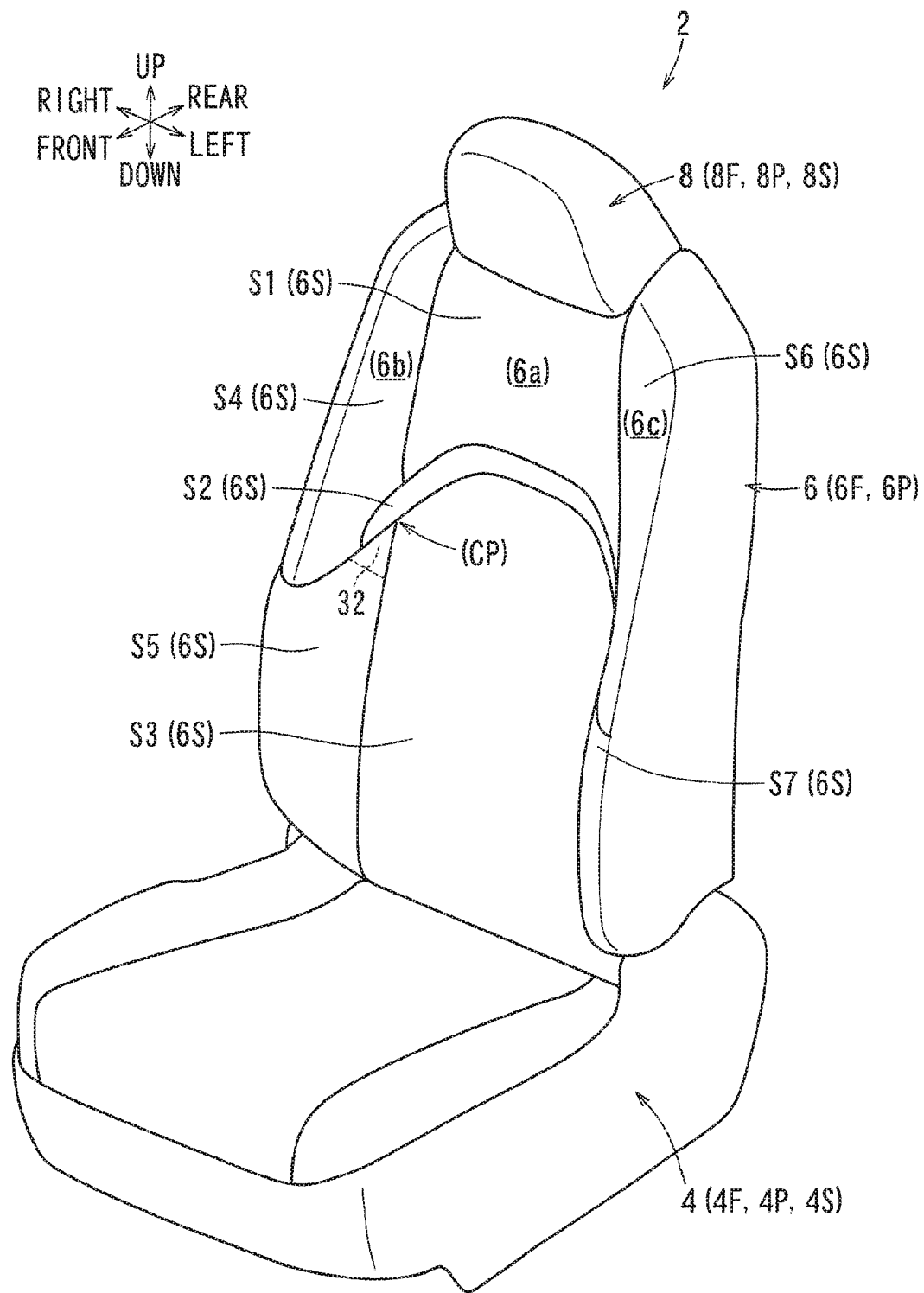
FIG. 1 is a schematic perspective view of a vehicle seat.

FIG. 1 depicts an embodiment of a vehicle seat 2. The vehicle seat 2 in FIG. 1 may include a seat cushion 4, a seat back 6, and a head rest 8. The seat cushion 4, seat back 6, and head rest 8 may include seat frames 4F, 6F, 8F configured to form a seat framework, seat pads 4P, 6P, 8P configured to form a seat outer contour, and cover sheets (e.g., seat cover) 4S, 6S, 8S for covering the seat pad, respectively. A lower part of the seat back 6 may be reclinably connected to a rear part of the seat cushion 4. The head rest 8 may be arranged in an upper middle portion of the seat back 6.

Figure 2:
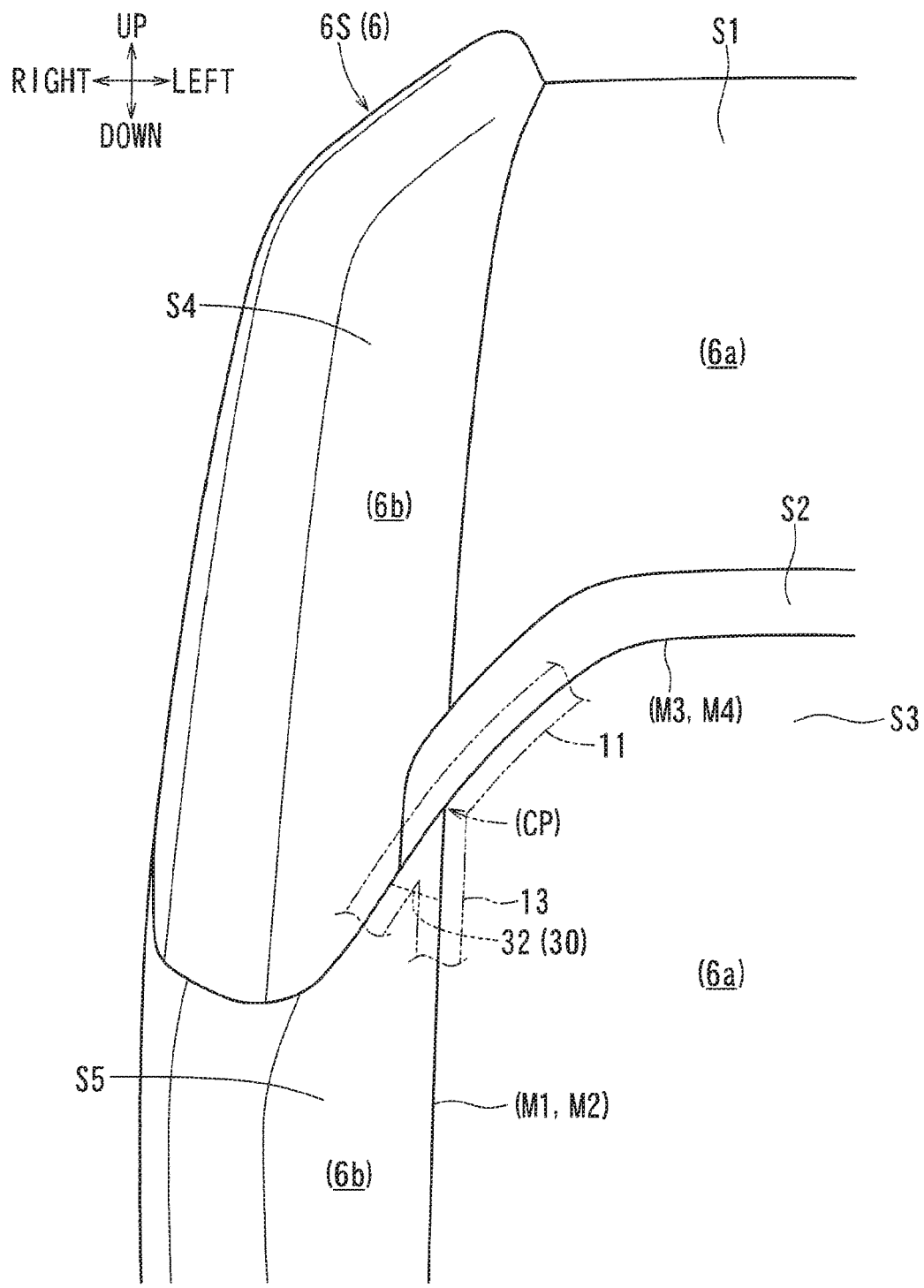
FIG. 2 is an enlarged front view of an upper right side of a seat back.
Figure 9:
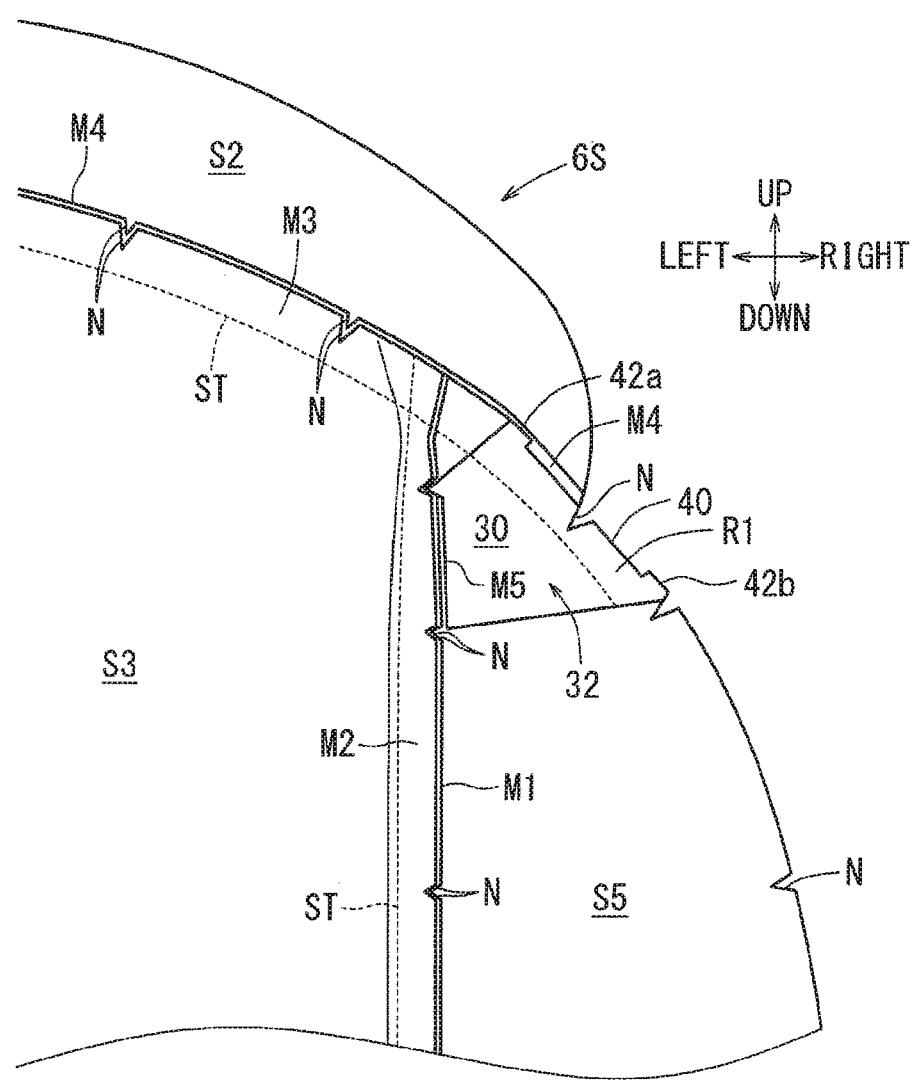
FIG. 9 is a rear side view of the seat cover with a portion of the skin materials sewed together.

The seat back 6 in FIG. 1 has substantially a rectangular shape in a front view, and may constitute a backrest for a passenger. The seat back 6 may include the above described seat frame(s) 6F, seat pad(s) 6P, and cover sheet(s) 6S. The seat back 6 has a surface constituted by a seat cover 6S formed of a plurality of the skin materials S1 to S7, etc. As depicted in FIGS. 2 and 9, the seat cover 6S may include seam allowances M1 to M4 that protrude from a back surface of the seat cover 6S. Each of the seam allowances M1 to M4 may be arranged in corresponding grooves (such as grooves 11 or 13) formed in the seat pad 6P. In the present embodiment, skin materials S2, S3, S5 are sewed together in an intersecting manner to generally form a T-shape, which may improve the design of the vehicle seat 2. Portions of seam allowances M1 to M4 may be arranged in an intersecting area CP of the grooves.

Figure 3:
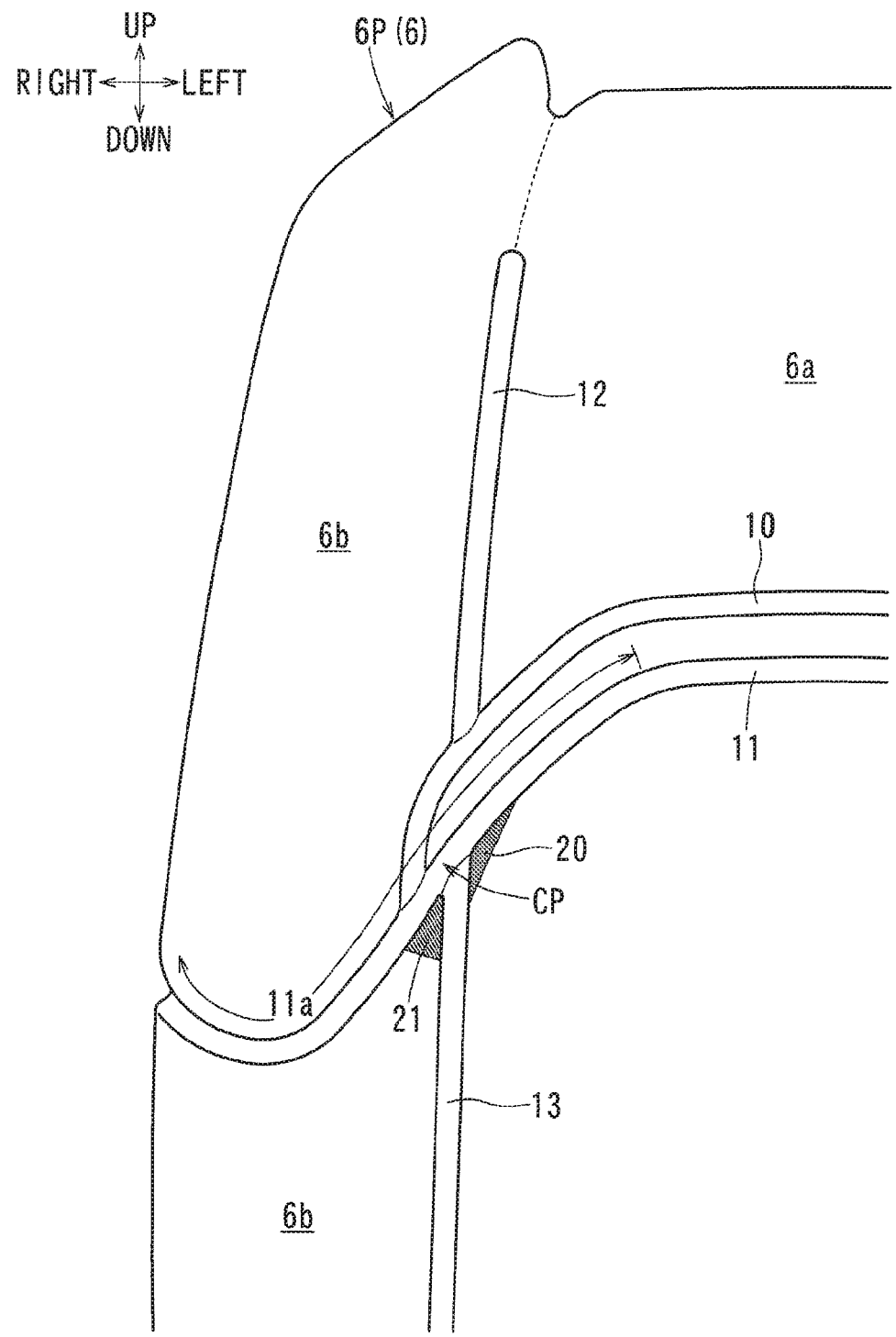
FIG. 3 is an enlarged front view of the upper right side of the seat pad showing each of grooves.

In the embodiment depicted in FIGS. 1 to 3, the seat back 6 includes the seat pad 6P that is arranged on the seat frame 6F (not shown) and the seat cover 6S covering the seat pad 6P. The seat frame 6F may be a frame body having substantially an arc-shape and may be made of metal or hard resin having an excellent rigidity. The seat pad 6P may have a substantially rectangular shape and may include a plurality of the grooves 10 to 13. Although a material for the seat pad 6P is not particularly limited, a foamed resin such as a polyurethane foam (density: 10 to 60 kg/m3) may be used for the seat pad 6P, for example. A front surface serving as a seating surface of the seat pad 6P may include a top plate main portion 6a and a pair of right and left top plate side portions 6b, 6c. In this embodiment, the top plate main portion 6a vertically extends along the center of the seat back 6 in the seat width direction (right-left direction in each of the figures), so that a back of the passenger can come in contact with it. Each of the top plate side portions 6b, 6c may be elevated forward on the right side or left side of the top plate main portion 6a.

In the embodiment depicted in FIG. 3, a pair of center grooves 10, 11 and a plurality of the side grooves 12, 13 are formed in the seating surface of the seat pad 6P. The pair of the center grooves (upper center groove 10 and lower center groove 11) are recessed parts of the seat pad 6P that traverse laterally across a portion of the top plate main portion 6a and the right top plate side portion 6b. Right and left ends of each of the center grooves 10, 11 may be substantially symmetrical to each other and may include curved portions, for example curved in a downward direction. The upper center groove 10 is disposed above the lower center groove 11. Right and left side portions of the upper center groove 10 may be symmetrical to each other and may include a curved portion. The lower center groove 11 may be disposed below the upper center groove 10 and may be arranged substantially parallel to the upper center groove 10. A right end portion 11a of the lower center groove 11 may traverse a portion of the right area of the top plate main portion 6a and the right top plate side portion 6b. In this embodiment, the right end portion 11a gradually curves downward as it extends toward the right side. The right end portion 11a and the right end portion of the upper center groove 10 may be connected at the right top plate side portion 6b.

As depicted in FIGS. 1 and 3, a plurality of lateral grooves 12, 13 may be formed between the top plate main body portion 6a and the corresponding top plate side portion 6b or 6c (for the sake of explanation, FIG. 3 only shows the right side lateral grooves). The right side lateral grooves (right upper lateral groove 12 and right lower lateral groove 13) illustrated in FIG. 3 are disposed between the top plate main portion 6a and the right side top plate side portion 6b and extend in an up-down direction. The right upper lateral groove 12 may be disposed above the upper center groove 10 while the lower end of the right upper lateral groove 12 may be connected to the upper center groove 10 so as to intersect the upper center groove 10. The right lower groove 13 may be disposed below the lower center groove 11, while the upper end of the right lower lateral groove 13 may be connected to the right end portion 11a of the lower center groove 11 so as to intersect the lower center groove 11 at an area corresponding to the intersecting area CP. Similarly, the left lateral grooves (not shown) may be formed between the top plate main portion 6a and the left top plate side portion 6c. Each of these left lateral grooves may be structured similarly to each of the right lateral grooves 12 and 13 and may extend in the up-down direction so as to intersect the center grooves 10 and 11, respectively.

In the present embodiment, the lateral grooves 12 and 13 and the corresponding center grooves 10 and 11 illustrated in FIG. 3 intersect at appropriate locations. These grooves are positioned such that each of the seam allowances of the skin materials S1 to S7 may be arranged in the appropriate groove. The width and depth of each of the grooves may be approximately the same at each intersecting area. The intersecting area CP between the lower center groove 11 and the right lower lateral groove 13 will be described in details as one example of an intersecting area. The right end portion 11a of the lower center groove 11 and the right lower lateral groove 13 illustrated in FIG. 3 intersect so as to generally form a T-shape near the border between the top plate main portion 6a and the right top plate side portion 6b. In the intersecting areas CP of the grooves, an opening size of the recessed part is relatively larger than the other portions of the recesses. In the intersecting area CP, a relatively large portion of the seat pad 6P does not directly support the seat cover 6S. For example, a center point from the portion of the seat cover 6S not directly supported by the seat pad 6P to a nearest point in which the seat cover 6S is directly supported by the seat pad 6P is longer in the intersecting area CP than in other areas of the grooves.

In the intersecting area CP illustrated in FIG. 3, the lower central groove 11 and the right lower lateral groove 13 intersect each other. Because of the intersection of the grooves, one or more corner may be formed in a portion of the seat pad 6P that directly supports the seat cover 6S. For example, the seat pad 6P includes a left lower corner 20 and a right lower corner 21 in the intersecting area CP (FIG. 3 shows each of the corners with hatching for the sake of explanation). In this embodiment, the left lower corner 20 is located on a left side of an upper end of the right lower lateral groove 13 and is a part of the seat pad 6P in the top plate main portion 6a. This left lower corner 20 forms substantially a triangular shape. The left lower corner 20 may be structured to have a peak with an obtuse angle that orients upward to face the intersecting area CP of the grooves. The right lower corner 21 is located on a right side of the upper end portion of the right lower lateral groove 13 and is a part of the seat pad 6P in the right top plate side portion 6b. This right lower corner 21 forms substantially a triangular shape. The right lower corner 21 may be structured to have a peak with an acute angle that orients upward to face the intersecting area CP of the grooves. Since the peak of the right lower corner 21 facing the intersecting area CP has an acute angle, the rigidity of the seat pad 6P at this portion is relatively small, thereby being easily deformed.

Figure 4:
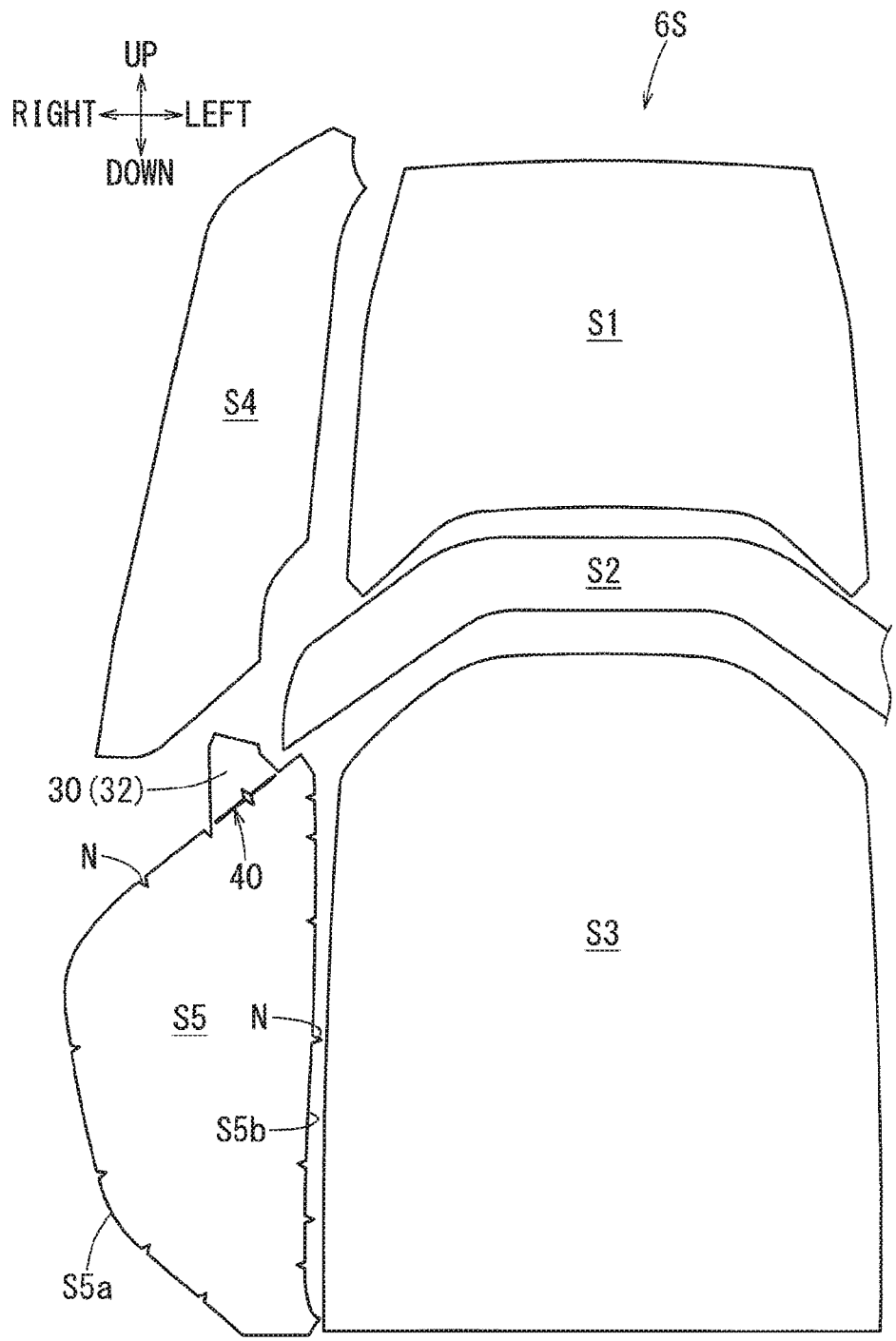
FIG. 4 is a front view of various skin materials.

As illustrated in FIGS. 1 and 2, the seat cover 6S includes the plurality of the skin materials S1 to S7 and may be assembled by sewing adjacent skin materials together. In each of the figures, for the sake of explanation, the specific skin materials are denoted by specific reference numerals S1 to S7 and reference numerals for the other skin materials are omitted. For example, the seating surface of the seat cover 6S includes the plurality of main skin materials S1 to S3, a pair of right side skin materials S4, S5, and a pair of left side skin materials S6, S7. The plurality of the main skin materials (upper main skin material S, intermediate main skin material S2, and lower main skin material S3) may cover the top plate main portion 6a, and may be disposed next to each other in the up-down direction. As depicted in FIGS. 2 and 4, the upper main skin material S1 has a substantially rectangular shape and is configured to cover the upper area of the top plate main portion 6a. The lower main skin material S3 has a substantially rectangular shape and is configured to cover the lower area of the top plate main portion 6a. The lower edge of the upper main skin material S1 and the upper edge of the lower main skin material S3 are respectively formed in a curved shape projecting upward. The intermediate main skin material S2 is disposed between the upper main skin material S and the lower main skin material S3. The intermediate main skin material S2 has a substantially rectangular shape with a relatively small vertical dimension and is laterally elongated. The right end (and left end) of the intermediate main skin material S2 gradually curves downward and protrudes into the corresponding top plate side portion 6b (6c).

The right side skin materials S4, S5 (and the left side skin materials S6, S7) may cover the corresponding top plate side portion 6b (6c). Since the right side skin materials S4, S5 have substantially the same basic structure as the left side skin materials S6, S7, except that they are substantially symmetrical with each other in left and right direction relative to the main skin materials S1 to S3 interposed therebetween, only the right side skin materials S4, S5 will be described in detail as a representative example. As depicted in FIGS. 2 and 4, the right upper side skin material S4 and the right lower side skin material S5 cover a portion of the right top plate side portion 6b and are disposed next to each other in the up-down direction. The right upper side skin material S4 covers the upper area of the right top plate side portion 6b. This right upper side skin material S4 is formed in substantially a parallelogram shape. The upper edge and the lower edge of the right upper side skin material S4 gradually incline upward as they extend toward the left side. The right lower side skin material S5 covers the lower area of the right top plate side portion 6b and includes a high-rigidity portion 32 (overlapping portion 30). This right lower side skin material S5 is formed in substantially a semi-circular shape having a peak oriented in right direction. A right edge S5a of the right lower side skin material S5 is formed in a circular-arc shape protruding in the right direction. A left edge S5b of the right lower side skin material S5 extends substantially straight in the up-down direction. A plurality of notches N with a triangular cutout shape and/or a triangular protruding shape may be provided in appropriate locations at the peripheral edge of each of the skin materials (S5 etc.). For the sake of explanation, FIG. 4 only shows the notches of the right lower side skin material S5, but does not show the notches of the other skin materials. When forming the seat cover 6S, adjacent skin materials can be sewn together at appropriate locations, using the notches N as guides.

Figure 5:
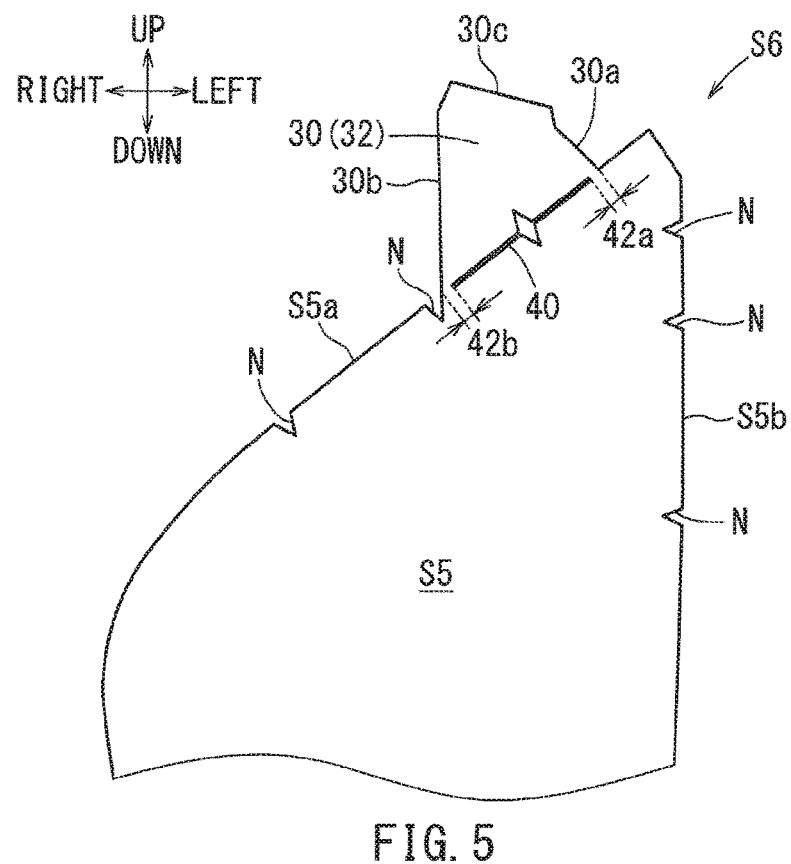
FIG. 5 is an enlarged rear side view of a skin material with an overlapping portion.
Figure 6:
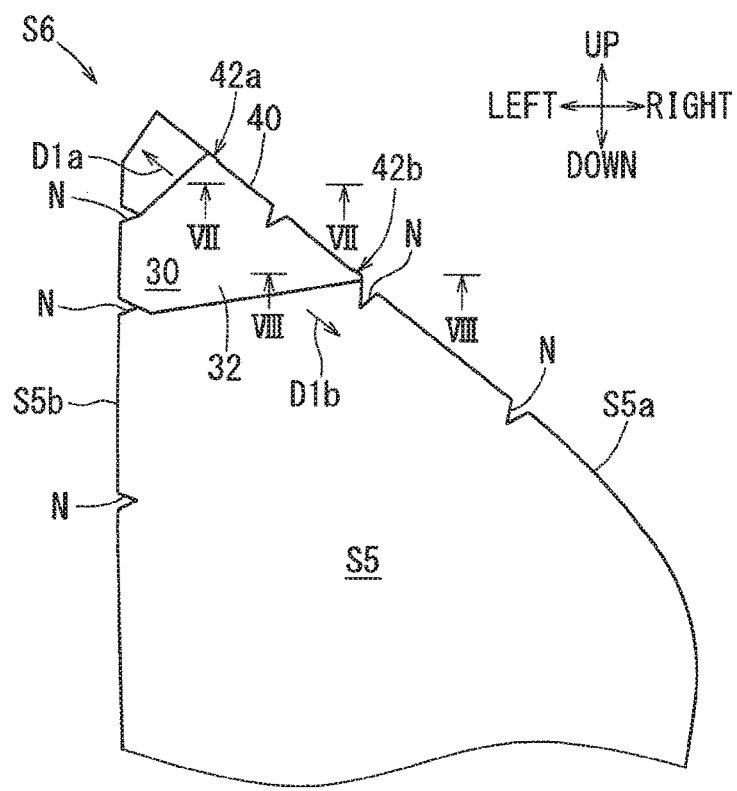
FIG. 6 is an enlarged rear side view of the skin material with a high-rigidity portion.

As illustrated in FIGS. 4 to 6, the right lower side skin material S5 may be formed with an overlapping portion 30, a base line 40, and a pair of bridge portions 42a, 42b. The overlapping portion 30 may be a planar portion extending from an upper right edge of the right lower side skin material S5 in an unassembled state and may constitute a portion of the high-rigidity portion 32 in an assembled state. This overlapping portion 30 may be formed in substantially a parallelogram shape in the front view, although other shapes may also be used in other embodiments. The overlapping portion 30 may include an upper edge 30a and lower edge 30b respectively extending upward and rightward from the right lower side skin material S5. The overlapping portion 30 may also include an outer edge 30c extending in a substantially left-right direction connecting a right end of the upper edge 30a and a right end of the lower edge 30b. In this embodiment, the outer edge 30c of the overlapping portion 30 is inclined gradually downward as it extends leftward. The outer edge 30c may then be lined up with the left edge S5b of the right lower side skin material S5 by folding the overlapping portion 30 back onto the right lower side skin material S5. The right lower side skin material S5 and the overlapping portion 30 (including, 42a, 42b) may be formed as an integral member. For example, in the present embodiment, the right lower side skin material S5 and the overlapping portion 30 may be integrally formed by cutting a single raw material using a predetermined pattern. In this way, it is possible to simplify the structure and increase productivity, as compared to using separate members. This configuration may reduce production costs.

As illustrated in FIG. 5, the base line 40 may be located at a border between the right lower side skin material S5 and the overlapping portion 30. The base line 40 may aid in folding the overlapping portion 30 onto the right lower side skin material S5. The base line 40 may be formed by cutting a linear slot into a portion of the skin material at the intersection of the right lower side skin material S5 and the overlapping portion 30. A pair of upper and lower bridge portions 42a, 42b may flank each end of the base line 40. The linear slot may extend through the right lower side skin material S5 in its thickness direction. The bridge portions 42a, 42b connect the right lower side skin material S5 and the overlapping portion 30. The bridge portions 42a, 42b traverse the width of the linear slot of the base line 40 in generally the up-down direction. In some embodiments, the bridge portions 42a, 42b and the linear slot may not be formed.

Figure 7:
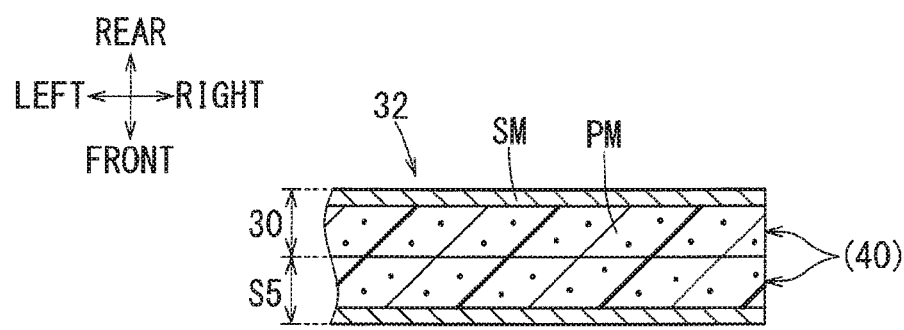
FIG. 7 is a cross-sectional view of the skin material corresponding to a cross-section taken along the line VII-VII of FIG. 6.
Figure 8:
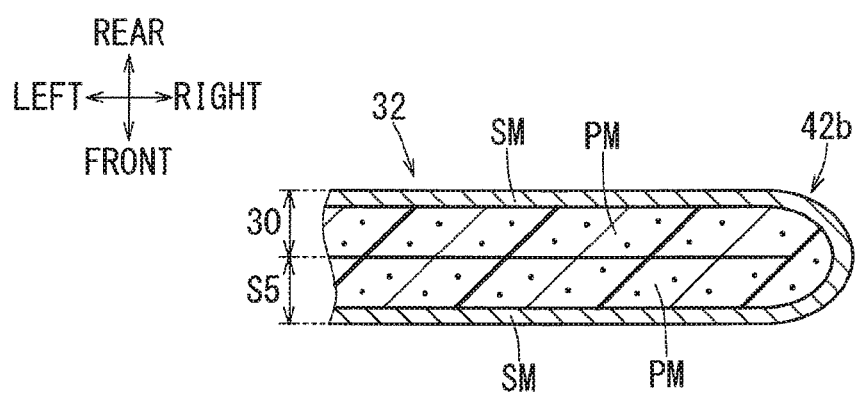
FIG. 8 is a cross-sectional view of the skin material corresponding to a cross-section taken along the line VIII-VIII of FIG. 6.

Since each of the skin materials S1 to S7 illustrated in FIG. 1 include substantially the same basic structure, the details of the right lower side skin material S5 will be described below as a representative example. As depicted in FIGS. 7 and 8, the right lower side skin material S5 may include a skin material SM functioning as a design surface and a pad material PM which is integrally formed on a rear surface of the skin material SM. A planar material capable of constituting the design surface of the seat may be used as a raw material for the skin material SM; for example, a leather (natural leather, synthetic leather, etc.) or a textile fabric (woven fabric, knit, non-woven fabric, etc.) may be used. Various elastically stretchable planar materials may be used as a pad material PM; for example, a foamed resin such as a urethane laminate may be favorably used. For example, the right lower side skin material S5 in the present embodiment may be formed by integrating the skin material SM made of a textile fabric and the pad material PM made of a urethane laminate in a method of, for example, flame lamination. An easily deformable back lining fabric (for example, a non-woven fabric) thinner than the skin material SM may be provided on the rear surface of the pad material PM.

As depicted in FIGS. 5 to 8, a high rigidity portion 32 may be formed at the right lower side skin material S5 prior to sewing adjacent skin materials together, as will be described later. As illustrated in FIGS. 6 and 7, the high-rigidity portion 32 can be located in the upper region of the right lower side skin material S5. The high-rigidity portion 32 may be formed by folding the overlapping portion 30 onto the rear surface of the right lower side skin material S5 (the rear side is depicted in FIG. 7). Accordingly, the high-rigidity portion 32 may include a plurality of overlapping layers of the right lower side skin material S5, or overlapping layers of other materials if the overlapping portion 30 is separately formed. For example, the high-rigidity portion 32 may include two layers of skin material SM and two layers of pad material PM. This high-rigidity portion 32 has a higher rigidity than that of other portions of the right lower side skin material S5. The high-rigidity portion 32 may be made to be relatively hard to flex and deform. The linear slot formed in the base line 40 may allow the overlapping portion 30 to be smoothly folded back about the base line 40 and onto the rear surface of the right lower side skin material S5. As illustrated in FIG. 7, this folding may cause the pad material PM of the right lower side skin material S5 to come directly into contact with the pad material PM of the overlapping portion 30. This overlapping occurs at the high-rigidity portion 32. This direct contact between the pad materials PM provides the high-rigidity portion 32 with a similar elasticity as a case where the thickness of the pad material PM is doubled, depending on the elasticity of the skin material SM. In some embodiments, the elasticity of the skin material SM may cause the elasticity of the high-rigidity portion 32 to be more than double the elasticity of the pad material PM.

As illustrated in FIG. 7, the right lower side skin material S5 and the overlapping portion 30 may be separated at the linear slot in the base line 40. Therefore, the linear slot serves to reduce effects due to a difference in peripheral length that may be caused when the skin materials SM and/or the pad materials PM is/are subjected to bending deformation. Additionally, this configuration may avoid an edge of the high-rigidity portion 32 from becoming elevated. The elevation could be generated by the difference in peripheral length of the skin materials SM and the pad materials PM when the skin materials SM or the like is subjected to bending deformation. As depicted in FIGS. 6 and 8, the right lower side skin material S5 and the overlapping portion 30 are integrally formed at each of the bridge portions 42a, 42b, which are provided on each end of the base line 40. Therefore, it is possible to substantially avoid the overlapping portion 30 from being displaced in generally the up-down direction, which is indicated by arrows D1a, D1b in FIG. 6, when the overlapping portion 30 is folded back. Accordingly, the overlapping portion 30 can be laid on the back of the right lower side skin material S5 with an appropriate alignment. By having the overlapping portion 30 be connected to the right lower side skin material S5 as described above, a provisional fixation structure (e.g., sewing seams or using tapes for basting) can be eliminated, thereby improving workability and production.

As illustrated in FIG. 9, adjacent skin materials may be sewn together with inside stitches ST, when forming the seat cover 6S of FIG. 1. Further, each of the seam allowances M1 to M5 projects from the rear surface of the seat cover 6S (in FIG. 9, only some skin materials S2, S3, S5 are illustrated for the purpose of explanation). Since the method of sewing each of the skin materials together is substantially the same, an embodiment of the method of sewing pieces together will be described as a representative example by referring to the right lower side skin material S5 and the corresponding main skin materials (intermediate main skin material S2 and the lower main skin material S3).

As depicted in FIG. 9, the left edge of the right lower side skin material S5 may be sewed together with the right edge of the lower main skin material S3 with inside stitches ST. This forms a left seam allowance M1 and a right seam allowance M2 in a portion of the corresponding skin material between the inside stitches ST and the edge of the skin material. An overlapping seam allowance M5 may also be formed in a portion of the overlapping portion 30 between the inside stitches ST and the edge of the overlapping portion 30. The inside stitches ST may be formed while a front surface of the right lower side skin material S5 is laid over a front surface of the lower main skin material S3. In some embodiments, an edge of the overlapping portion 30 may also be laid over the rear surface of the right lower skin material S5, so as to position the right lower side skin material S5 between the overlapping portion and the lower main skin material S3 when forming the inside stitches ST. Subsequently, the right lower side skin material S5 and the lower main skin material S3 are opened to project from the inside stitches ST as a base line and in a planar manner. The seam allowances M1, M2 are arranged to project from the rear surface of the seat cover 6S. The overlapping seam allowance M5 may also be arranged to project from the rear surface of the seat cover 6S. The left seam allowance M1 and right seam allowance M2 extend along the up-down direction and along the inside stitches ST. The front surfaces of the left and right seam allowance M1, M2 may be arranged to face or contact each other. The overlapping seam allowance M5 may also extend along the up-down direction and along the inside stitches ST, so as to face and contact the right lower side skin material S5.

As depicted in FIG. 9, upper edges of the right lower side skin material S5 and the lower main skin material S3 may be sewn together with a lower edge of the intermediate main skin material S2 with inside stitches ST. This forms an upper seam allowance M3 and a lower seam allowance M4 in a portion of the corresponding skin material between the inside stitches ST and the edge of the skin material. A rigid hem R1 may be formed in a portion the right lower side skin material S5 so as to extend from the inside stitches ST to the edge of the bridge portions 42a, 42b. The inside stitches ST are formed while a front surface of the right lower side skin material S5 is laid over a front surface of the intermediate main skin material S2. In some embodiments, the portion of the right lower side skin material S5 that is laid over the front surface of the intermediate main skin material S2 may be a portion near the base line 40 of the overlapping portion 30.

Subsequently, the right lower side skin material S5, the lower main skin material S3, and the intermediate main skin material S2 are opened to project from the inside stitches ST as a base line in a planar manner. The seam allowances M3 and M4 are arranged to project from the rear surface of the seat cover 6S. The rigid hem R1 may also be arranged to project from the rear surface of the seat cover 6S. The upper seam allowance M3 and the lower seam allowance M4 in this state extend in a substantially left-right direction along the inside stitches ST, and their front surfaces are facing or contacting each other. The rigid hem R1 may also extend in a substantially right-left direction along the inside stitches ST and may face and contact a portion of the lower seam allowance M4. In some embodiments, the rigid hem R1 does not face and contact a major plane surface of the upper seam allowance M3. The other skin materials are also sewn to the corresponding edges of the right lower side skin material S5, the intermediate main skin material S2 and the lower main skin material S3. Thereby, the seat cover 6S illustrated in FIG. 1 can be formed.

In the above-described structure, each of the seam allowances M1 to M5 and the rigid hem R1 illustrated in FIG. 9 may be arranged upright on the corresponding skin material. However, the seam allowances M1 to M5 and the rigid hem R1 may also be arranged so as to be laid down along the corresponding skin material.

Figure 10:
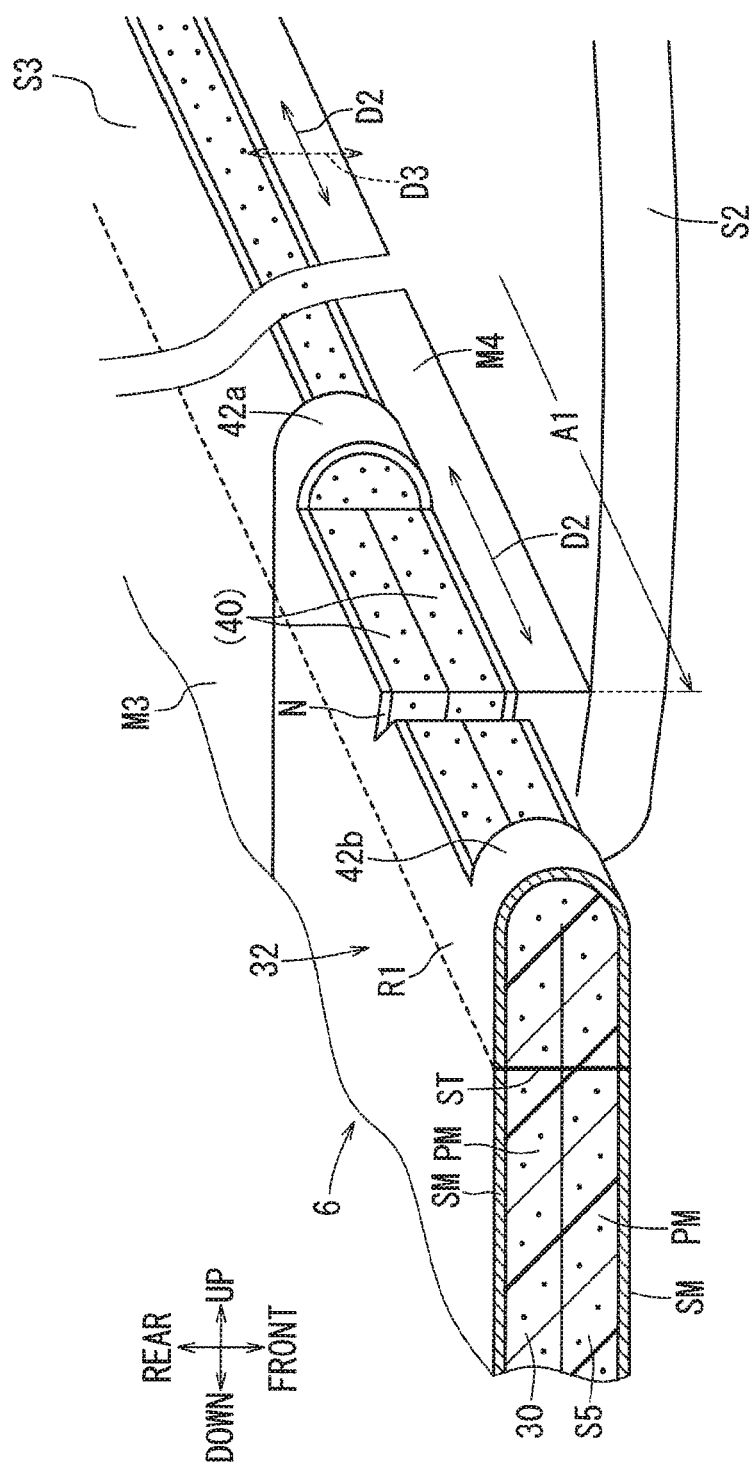
FIG. 10 is a partially enlarged perspective view of the seat cover of FIG. 9.

Referring to FIGS. 9 and 10, one embodiment of the rigid hem R1 of the right lower side skin material S5, the upper seam allowance M3 of the lower main skin material S3, and the lower seam allowance M4 of the intermediate main skin material S2 will be discussed as an example as a possible arrangement of these assembled part. In the present embodiment, a portion of the area corresponding the lower seam allowance M4 of the intermediate main skin material S2 is positioned over a portion of the area corresponding to the upper seam allowance M3 of the lower main skin material S3. The area corresponding to the rigid hem R1 of the high-rigidity portion 32 is positioned over another portion of the lower seam M4 of the intermediate main skin material S2. In some embodiments, a side surface of the rigid hem R1 may contact a side surface of the upper seam allowance M3. In some embodiments, the rigid hem R1 may not overlap the upper seam allowance M3 in the same direction that it overlaps the lower seam allowance M4.

Using the above configuration, the rigid hem R1 of high-rigidity portion 32 pushes the corresponding portion of the lower seam allowance M4 toward a direction in which a main surface of the intermediate main skin material S2 is arranged (e.g., the rear surface). Additionally, the upper seam allowance M3 pushes the corresponding portion of the lower seam allowance M4 towards the direction in which the main surface of the intermediate main skin material is arranged. In this way, the upper seam allowance M3, the entire lower seam allowances M4, and the rigid hem R1 may be arranged along the intermediate main skin material S2 and/or projecting in the same direction.

In a first region A1 depicted in FIG. 10, a portion of the lower seam allowance M4 is overlapped by a portion of the high-rigidity portion 32 (e.g., a portion corresponding to the rigid hem R1). In a second region A2, the lower seam allowance M4 is not overlapped by the high-rigidity portion 32. The first region A1 and the second region A2 are adjacent to each other across the notch N. In some embodiments, the notch N where the first and second regions A1, A2 intersect may be used for aiding alignment of the various surface skins being joined together at this point. The first region A1 and the second region A2 are oriented substantially in the same direction. End surfaces of the first region A1 and the second region A2 are substantially on the same plane and extend in the direction indicated by an arrow D2.

As shown in FIG. 10, the first region A1 and the second region A2 of seam allowances M3 and M4 and rigid hem R1 all extend in the same direction, i.e. upward, to follow a major surface (e.g., the back surface) of the intermediate main skin material S2. This is partly aided by the rigid hem R1. If the rigid hem R1 was absent, it is likely that the lower seam allowance M4 in a region corresponding to the first region A1 of the present embodiment may become folded or dislodged so as to extend in a direction opposite to the direction of a portion of the lower seam allowance M4 in the region corresponding to the second region A2. The possibility of this occurring is increased by the alignment notch N causing a weakening of the lower seam allowance M4 about the intersection between the first and second regions A1, A2 and/or the increased area of the intersecting area CP of the seat pad 6P. This misaligned configuration may deteriorate the appearance of the seat cover 6S. On the other hand, according to the present example, the high-rigidity portion 32 helps the first region A1 and the second region A2 to be folded and continuously extend in the same direction, thereby improve the appearance of the seat cover 6S.

Figure 11:
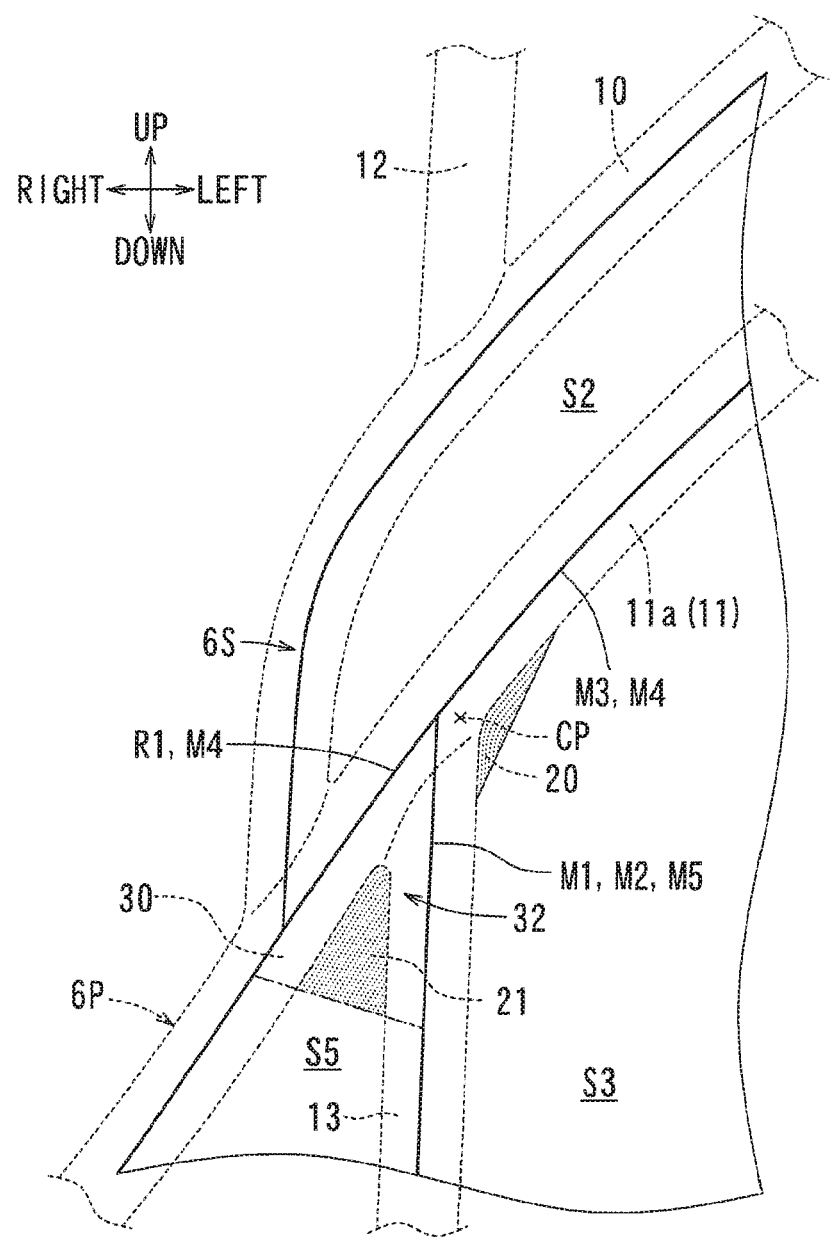
FIG. 11 is a front view of the seat cover of FIG. 9 and the seat pad with grooves.

Referring to FIGS. 1, 2, and 11, each of the seam allowances M1 to M5 and the rigid hem R1 may be arranged in the corresponding groove 11, 13 when the seat cover 6S covers the seat pad 6P. In the embodiment illustrated in FIG. 11, the right lower side skin material S5 and the main skin materials S2, S3 corresponding to the right lower side skin material S5 are sewn together to generally form a T-shape. Some parts of each of the seam allowances M1 to M5 and the rigid hem R1 are arranged in the intersecting area CP of the grooves 11, 13 in the seat pad 6P. At the intersecting area CP of the grooves, the seat pad 6P alone is insufficient for bearing the seat cover 6S, since the size of this recessed part is relatively larger than that of an area of the single groove 11 or 13 that are not intersected by another groove. Further, since the right lower corner 21 of the seat pad 6P is located at the intersecting area CP of the grooves, the rigidity at the right lower corner 21 is relatively lower and may be easily deformed.

However, the present embodiment is able to compensate for the inability of the seat pad 6P alone to support the seat cover 6S in the intersecting area CP of the grooves. For example, a high-rigidity portion 32 may be provided on at least one skin material (for example, the right lower side skin material S5) of adjacent skin materials. The high-rigidity portion 32 may be formed by laying the overlapping portion 30 over a portion of the back surface of one of the skin materials. The high-rigidity portion 32 may be disposed at the intersecting area CP of the grooves, so as to cover the peak side of the right lower corner 21 when the seat pad 6P is covered by the seat cover 6S. Although the intersecting area CP of the seat pad 6P does not have enough rigidity to fully support the seat cover 6S in this area, the high-rigidity portion 32 helps compensate for this area of reduced rigidity. Therefore, it is possible to substantially avoid this portion of the seat cover 6S from becoming recessed or having some other form of reduced appearance. Further, the high-rigidity portion 32 helps maintain the appearance and support of the seat cover 62, even when the right lower angle 21 becomes deformed.

As illustrated in the embodiment of FIG. 7, the high-rigidity portion 32 comprises two pad materials PM laid one over the other and in contact with each other. This results in high-rigidity portion 32 having essentially the same elasticity and rigidity as the case where the thickness of the pad material PM is doubled. Therefore, the high-rigidity portion 32 enhances the rigidity of the seat cover 6S to improve the robustness of the seat cover 6S. This configuration may substantially avoid deformation of the seat cover 6S. As a result, the seat cover 6S can be disposed to cover an intersecting area CP of the grooves, while wrinkles are prevented from being generated, thereby improving the appearance of the seat cover 6S in the long run.

As described-above, a high-rigidity portion 32 with relatively enhanced rigidity may be formed by placing the planar overlapping portion 30 onto the back surface of the sear cover 6S. The high-rigidity portion 32 may be disposed so as to cover at least a portion of the intersecting area CP of the grooves and a corner (e.g., an acute angled corner such as right lower corner 21). Therefore, the high-rigidity portion 32 may maintain the shape of the seat cover 6S even if the strength of the portion of the seat pad 6P for bearing the seat cover 6S at the intersecting area CP of the grooves is low. Therefore, the appearance of the seat cover 6S is improved. Further, in the present embodiment, the overlapping portion 30 is integrally formed with a skin material (e.g., right lower side skin material S5). This causes the structure of the seat cover 6S to be simpler than a case where the skin material (S5) and the overlapping portion 30 are provided as separate members. Further, the overlapping portion 30 can be integrally formed in advance with the skin material (S5). As a result, it is not necessary to provisionally fix the pieces together, thereby eliminating the need to for the time and materials to provisionally attach these pieces. For instance, the high-rigidity portion 32 may be affixed in place concurrently when forming the inside stitches ST for attaching adjacent skin materials together. It is also possible to reduce the overall time and effort when forming the seat cover 6S.

Further, in the present embodiment, the linear slot of the base line 40 facilitates folding the overlapping portion 30 over the integrally formed skin material (e.g., right lower side skin material S5). Therefore, the high-rigidity portion 32 can be more easily formed. As illustrated in FIG. 10, connecting parts (e.g., bridge portions 42a and 42b) for connecting a skin material to the overlapping portion 30 may be provided on both sides of the linear slot of the reference line 40. In this way, the overlapping portion 30 can be more easily folded over the skin material in an appropriate direction and posture. Therefore, according to the present embodiment, the appearance of the portion of the seat cover 6S at the intersecting area CP of the grooves may be improved, even when the grooves 11 and 13 in the seat pad 6P are arranged in the intersecting manner.

Figure 12:
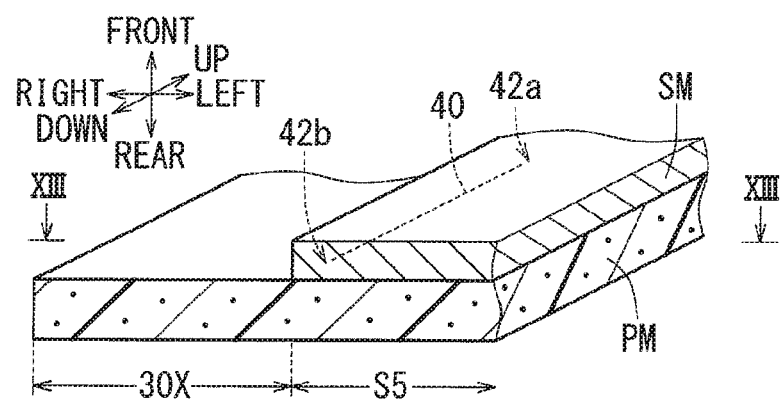
FIG. 12 is a partially broken perspective view of a skin material according to another embodiment.
Figure 13:
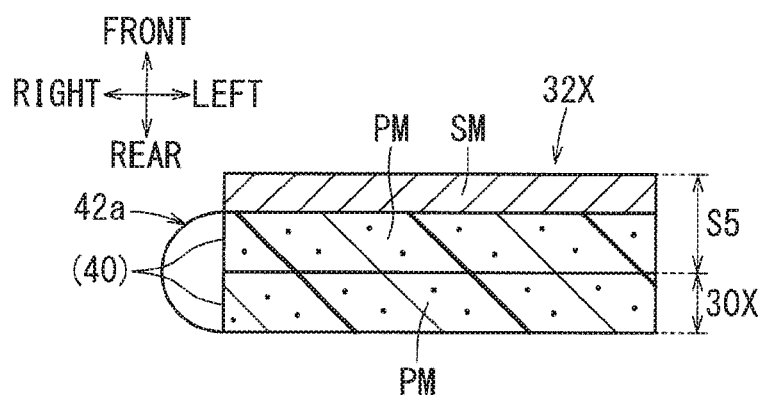
FIG. 13 is a cross-sectional view of the skin material formed with a high-rigidity portion according to the embodiment shown in FIG. 12.

Alternative to the structure of the overlapping portion 30 of the above embodiment(s), an overlapping portion 30X illustrated in FIGS. 12 and 13 may be adopted. The overlapping portion 30X illustrated in FIG. 12 may be folded back onto the right lower side skin material S5 to make a high-rigidity portion 32X illustrated in FIG. 13. As illustrated in FIG. 12, the right lower side skin material S5 includes both a skin material SM made of a suitable material (e.g., leather) and the pad material PM. The overlapping portion 30X is different from the overlapping portion 30 illustrated in FIG. 7 in that it is made of only the pad material PM. In this embodiment, the pad material PM of the right lower side skin material S5 and the pad material PM of the overlapping portion 30X are made of the same material and integrally formed. As depicted in FIG. 13, the linear slot of the base line 40 may be formed in the pad material PM, and the high-rigidity portion 32X may be formed by utilizing the linear slot to fold the overlapping portion 30X about the base line 40 so as to contact the right lower side skin surface S5. In some embodiments, the overlapping portion 30X may originally be integrally formed with the same skin material SM (e.g., made of leather) as that of the right lower side skin surface S5. However, the portion of the skin material SM of the overlapping portion 30X may be removed in advance of forming the high-rigidity portion 32X. By removing the portion of the skin material SM in the overlapping portion 30X, elevation of the edge of the high-rigidity portion 32X may be further reduced. In other embodiments, the skin material SM may be formed utilizing a different pattern (e.g., without overlapping portion) from that of the pad material PM. Thus, the amount of skin material SM (e.g., leather) can be reduced by the amount of the overlapping portion 30X, thereby reducing material costs.

Figure 14:
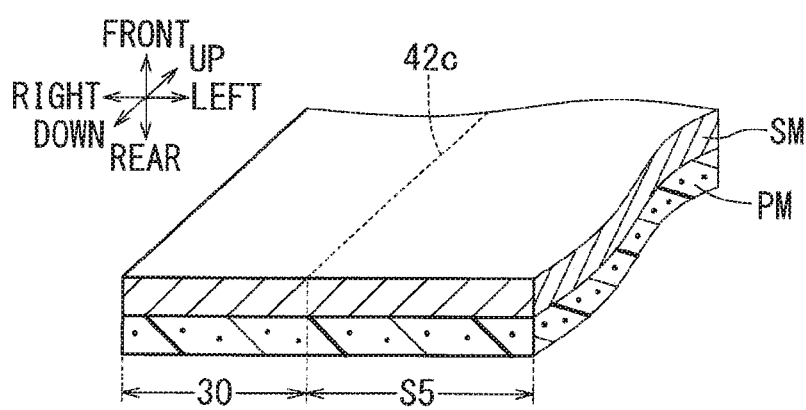
FIG. 14 is a partially broken perspective view of a skin material according to another embodiment.

As another alternative to the right lower side skin material S5 and the overlapping portion 30 illustrated in FIG. 10, the right lower side skin material S5 and the overlapping portion 30 illustrated in FIG. 14 may be provided. Both the right lower side skin material S5 and the overlapping portion 30 illustrated in FIG. 14 include the integrally formed skin material SM and pad material PM, however, a linear slot of the base line is not provided. Specifically, the skin material SM and the pad material PM of the right lower side skin material S5 are respectively connected with the skin material SM and the pad material PM of the overlapping portion 30 without the slot. In other words, a connecting part (such as connecting bridge 42c) illustrated in FIG. 14 corresponding to the bridge portion 42a and 42b illustrated in FIG. 5 is elongated so as not to include the linear slot. For example, the connecting bridge 42c may be elongated across the entire length of the base line 40. In FIG. 14, for the sake of explanation, the connecting bridge 42c is illustrated by a broken line, however; no cut line is provided in the actual right lower side skin material S5. Accordingly, the connecting bridge may correspond to the base line 40. However, an edge (for example, an edge formed at the connecting bridge 42c) of the high-rigidity portion may be moderately elevated or raised due to the difference in the peripheral length caused when the skin material SM and the pad material PM are deformed.

Figure 15:
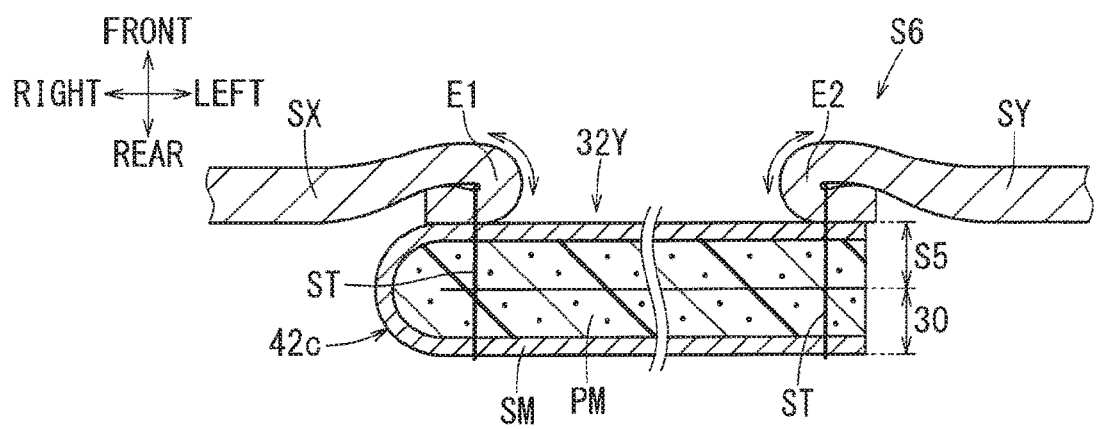
FIG. 15 is a cross-sectional view of a part of a seat cover of the embodiment shown in FIG. 14.

However, this elevated or raised portion may be compensated for. For example, as depicted in the embodiment of FIG. 15, the edge E1 of the right skin material SX is folded back and placed onto the right end portion of the high-rigidity portion 32Y and sewn together with inside stitches ST. The edge E2 of the left skin material SY is folded back and placed onto the left end portion of the high rigidity portion 32Y and sewn together with the inside stitches ST. The raised edge (e.g., that corresponding to the connecting bridge 42c) of the high-rigidity portion 32Y supports and pushes forward the edge E1 of the right skin material SX. Thereby the edge E1 is raised forward to provide a puffy texture. The other edge of the high-rigidity portion 32Y supports the edge E2 of the left skin material SY. Thereby the edge E2 is positioned forward to provide a puffy texture. The raised edges E1, E2 of each skin material SX, SY may rim an outer edge of the right lower side skin material S5. The puffy texture of the created rims may enhance an appearance of the seat cover 6S, especially when the seat cover 6S is viewed from the front.

In the following embodiment, components having substantially the same basic configuration as the vehicle seat according to the above embodiments are denoted by the corresponding reference numerals, the particulars of which will not be re-described. The vehicle seat 2A illustrated in FIG. 16 includes a seat cushion 4A and a seat back 6A. The seat cushion 4A has a laterally elongated rectangular shape so that a plurality of persons can be seated. A rear portion (e.g., bank portion 4d) of the seat cushion 4A may be raised upward so that the seat back 6A is provided on this raised portion.

Figure 16:
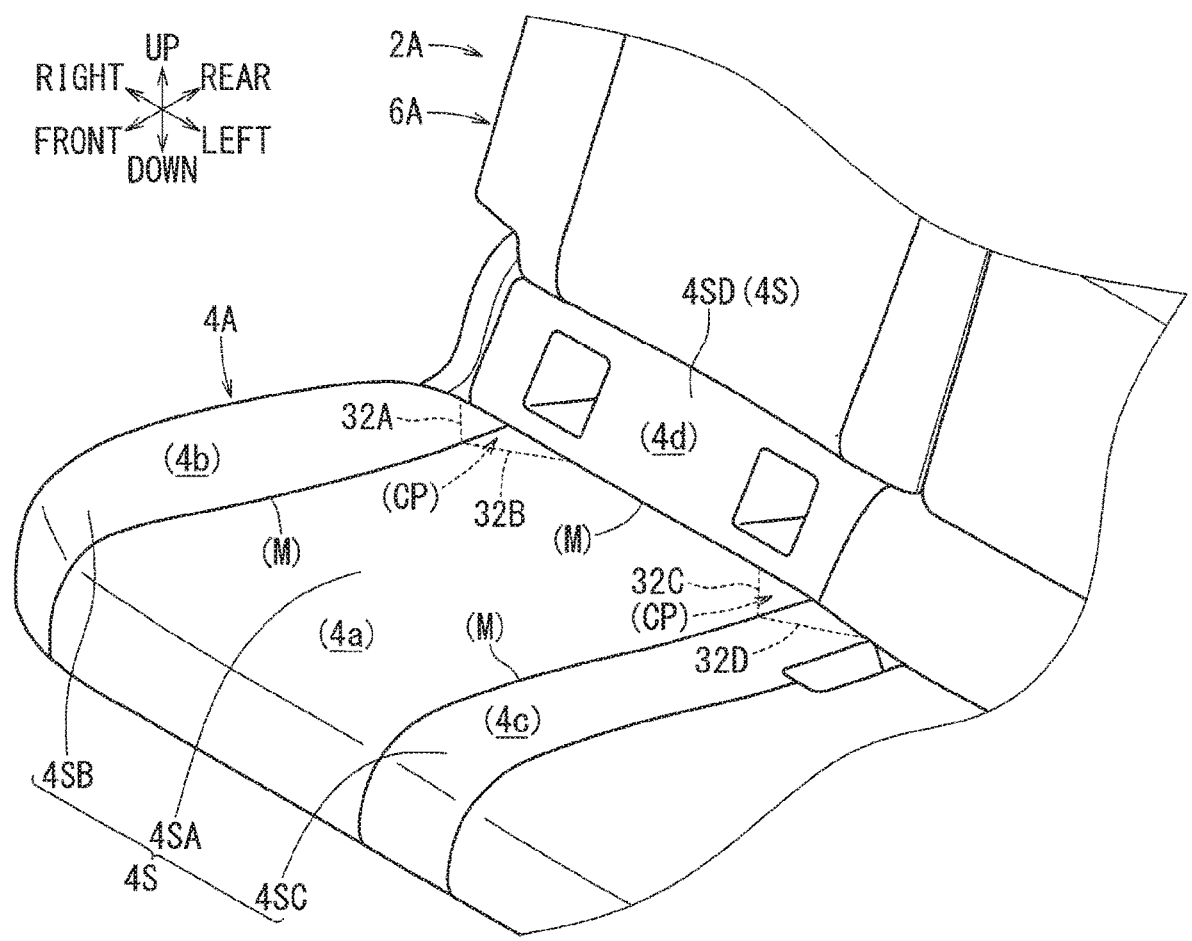
FIG. 16 is a perspective view of a part of a vehicle seat according to another embodiment.
Figure 17:
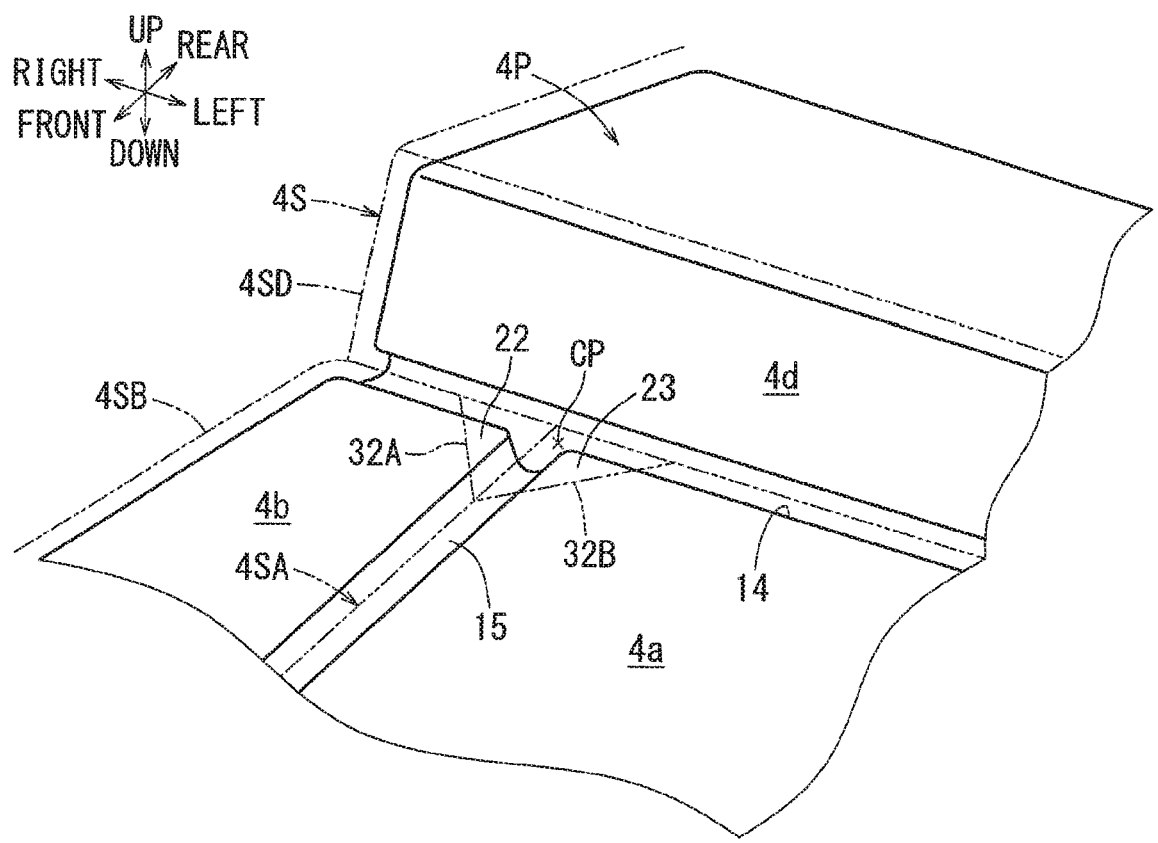
FIG. 17 is a perspective view of a seat pad according to the embodiment shown in FIG. 16.

As depicted in FIGS. 16 and 17, the seat cushion 4A may include a seat frame (not shown), a seat pad 4P, and a seat cover 4S. A right side of the upper surface of the seat pad 4P, which serves as a seating surface, includes a middle top plate main portion 4a, a right top plate side portion 4b, and a left top plate side portion 4c. The rear portion of the seat pad 4P may be formed with a bank portion 4d projecting upward. The bank portion 4d may have a substantially trapezoidal shape. As illustrated in FIG. 17, a lower end of the bank portion 4d may be formed with a lateral groove 14 extending in a right-left direction. This lateral groove 14 may be connected by and intersects with a vertical groove 15 formed between the top plate main portion 4a and the top plate side portion 4b. In this embodiment, the vertical groove 15 extends in a front-rear direction. An intersecting area CP of these grooves may be provided near a rear portion of the seat pad 4P.

As illustrated in FIG. 16, the seat cover 4S includes a first skin material 4SA, a second skin material 4SB, a third skin material 4SC, and a fourth skin material 4SD. The first skin material 4SA may cover the top plate main portion 4a. The second skin material 4SB may cover the right top plate side portion 4b. The third skin material 4SC may cover the left top plate side portion 4c. The fourth skin material 4SD may cover the front surface of the bank portion 4d. Adjacent edges of the first skin material 4SA and the second skin material 4SB (first skin material 4SA and third skin material 4SC) may be sewn together with inside stitches (not sown) extending in the front-rear direction. Seam allowances M of each of the skin materials may project backward from the seat cover 4S. In FIG. 16, for the sake of explanation, arrangement locations of the seam allowances are denoted by a reference sign M that indicates the seam allowance. A lower edge of the fourth skin material 4SD and rear edges of the other skin materials 4SA to 4SC, that are arranged in front of the lower edge of the fourth skin material 4SD, may be sewn together with inside stitches (not shown) extending in the left-right direction. The seam allowances M of each of the skin materials may project backward from the seat cover 4S. When the seat cover 4S covers the seat pad 4P, some parts of each of the seam allowances M of the seat cover 4S may be arranged in the intersecting area CP of the grooves of the seat pad 4P. Therefore, in the present embodiment as well, the seat pad 4P alone does not have a sufficient rigidity in the intersecting area CP of the groove to adequately support the seat cover 4S.

In view of the above, according to the present embodiment, the high-rigidity portions 32A to 32D may respectively be provided at the first skin material 4SA, the second skin material 4SB, and the third skin material 4SC. Each of the high-rigidity portions 32A to 32D may have substantially the same basic structure as those of the high-rigidity portions according to the previously embodiments. More specifically, the right end high-rigidity portion 32A may be provided on the left rear portion of the second skin material 4SB. The left end high-rigidity portion 32D may be provided on the right rear portion of the third skin material 4SC. The right inner high-rigidity portion 32B may be provided on the right rear portion of the first skin material 4SA. The left inner high-rigidity portion 32C may be provided on the left rear portion of the first skin material 4SA. As depicted in FIGS. 16 and 17, each of the high-rigidity portions 32A to 32D may be disposed on a portion of the intersecting area CP of the corresponding grooves and may cover the peak at the corresponding corners 22, 23. Further, adjacent high-rigidity portions 32A to 32D may be directly attached to each other (e.g., right end high-rigidity portion 32A and right inner high-rigidity portion 32B may be directly attached to each other). With such a configuration, the adjacent high-rigidity portions 32A to 32D may intersect at a portion of the intersecting area CP. Accordingly, in certain embodiments, a plurality of high-rigidity portions may be positioned to cover the same intersecting area CP. Therefore, in the above embodiment(s) as well, each of the high-rigidity portions 32A to 32D improves the robustness of the seat cover 4S to substantially avoid deformation of the seat cover 4S. Therefore, the seat cover 4S can be arranged on the intersecting area CP of the grooves in well finished manner.

The vehicle seat according to the present embodiment is not limited to the above-described embodiments, but also may be made in various other embodiments. In the above embodiments, the structures of the seat pads 4P and 6P (shapes, sizes, and a structure(s) of the grooves, etc.) have been exemplary described. However, this is not intended to limit the structure of the seat pads. For example, the grooves may be provided in appropriate locations of the seat pad considering the structure of the seat cover. Further, the intersecting area of the grooves may be formed to have an appropriate shape such as a cross-shape, an X-shape, an L-shape, a Y-shape, or any other shape other than the above described T-shape. Further, each of the grooves may be formed in a straight shape or curved shape, or may be curved in a wavy shape or bent in a zigzag shape. Further, the grooves may be provided on the seating surface, etc. of the seat pad so as to be symmetrical or asymmetrical.

In the present embodiments, the structures (shapes, sizes, structures of each of the skin materials) of the seat covers 4S and 6S have been exemplary described. However, this is not intended to limit the structure of the seat covers. For example, the adjacent parts of the skin materials of the seat cover may be sewn together to form an appropriate shape such as a cross-shape, an X-shape, L-shape, a Y-shape, or any other shape than the above described T-shape. Also, all skin materials may be formed from the same type of skin material and/or pad material, or some skin materials may be formed from different types of skin materials and/or pad materials. The method of forming the seat cover may be appropriately changed depending on the types or the number of the skin materials to be used.

Further, in the present embodiments, the structures (shapes, sizes, arrangement positions, the number of formations, etc.) of the overlapping portions 30 and the high-rigidity portions 32 have been exemplary described. However, this is not intended to limit the structures of the overlapping portions and/or the high-rigidity portions. For example, the overlapping portions may be configured separately from the corresponding skin materials. In this case, the high-rigidity portions may be formed by provisionary fixing the overlapping portion(s) on the skin material(s). Further, the separate overlapping portions may be formed of a resin seat material alternative to cloth or leather or alternative to the above described pad material PM. Further, when separate overlapping portions are used, the skin material of the overlapping portion may be placed on the pad material of the skin material so as to face each other. In this case, the skin material is interposed between two pad materials of the high-rigidity portions. In such a case, this may ensure proper a thickness dimension of each of the pad materials since the pad materials do not substantially stretch in cooperation with each other due to the interposed skin material. Further, in the high-rigidity portions, a plurality of the overlapping portions may be laid one over the other. In this case, a single overlapping portion may be folded over a plurality of times or separate overlapping portions may be laid one over the other. Further, the overlapping portions may be integrally provided with two opposing edges of the skin material (for example, right edge and left edge in FIG. 5) to form the high-rigidity portion. This may be done by folding each of the overlapping portions in a direction to approach and laminate each other. In some embodiments, the overlapping portion may overlap an adjacent skin material, rather than the skin material from which the overlapping portion was formed. For example, the high-rigidity portion may be formed in an area of an adjacent skin material from which the overlapping portion is formed. In such a case, a rigid hem may engulf a seam allowance of the adjacent skin material. Further, in the above embodiments, the high-rigidity portions were only provided to some skin materials. However, the high-rigidity portions may also be provided to all skin materials. The high-rigidity portion may be provided to at least one part of the skin material arranged on the intersecting area of the groove. Further, in some embodiments, the high-rigidity portion may be positioned so at to correspond to an entire skin material, for example in a situation where a seat pad being covered by the skin material has insufficient rigidity throughout that portion of the seat pad.

When a base line with a linear slit or slits is formed in the border between the overlapping portion and the skin material, the linear slit or slits may be formed on a side or sides of the base line (e.g., corresponding to the bridge portions 42a and 42b in FIG. 6). Further, a base line may run along through holes with elongated shapes, a plurality of through holes or perforations, linear recesses or the like. When a dimension of the linear slit of the base line is larger than the bridge portion (e.g., when sum of length is larger), the resulting structure may have a reduced puffy texture. However, when the dimension of the linear slit of the base line is smaller than the bridge portion, an increase puffy texture may result.

Further, in the above embodiments, the seat cushion 4 and the seat back 6 have been exemplary described. However, the structures according to the above embodiments may be adopted to various types of seat constituting components such as an armrest, headrest, etc. The structures of the seat pad and the seat cover may be appropriately modified depending on the seat constituting components to be adopted. Further, the structure of the vehicle seat may also be appropriately modified. The structures in the present embodiments may be adopted to overall vehicle seats for vehicles, aircrafts, trains, boats, ships, etc.

The various examples described above in detail with reference to the attached drawings are intended to be representative of the present disclosure and are thus non limiting embodiments. The detailed description is intended to teach a person of skill in the art to make, use, and/or practice various aspects of the present teachings and thus does not limit the scope of the disclosure in any manner. Furthermore, each of the additional features and teachings disclosed above may be applied and/or used separately or with other features and teachings in any combination thereof, to provide improved vehicle seats, and/or methods of making and using the same.

What is claimed is:

1. A vehicle seat, comprising:
   a seat pad having an intersecting area where a plurality of recessed grooves intersect to form a corner in the seat pad;
   a plurality of skin materials attached together at one or more seams so as to form a seat cover configured to cover the seat pad; and
   at least one seam allowance projecting from the at least one or more seams to an edge of the skin material and projecting into at least one of the recessed grooves, wherein
   at least one skin material of the plurality of skin materials integrally includes an overlapping portion folded underneath the at least one skin material such that the overlapping portion is positioned between the seat pad and an outer surface of the seat cover at the corner of the seat pad,
   the at least one skin material including the overlapping portion at the corner of the seat pad has a greater rigidity than a portion of the seat cover away from the corner of the seat pad, and
   the overlapping portion overlaps the corner formed by the intersection of the plurality of recessed grooves.

2. The vehicle seat according to claim 1, wherein the overlapping portion has a continuous surface with the at least one skin material.

3. The vehicle seat according to claim 1, wherein the at least one skin material and the overlapping portion are connected at base line where the overlapping portion is folded underneath the at least one skin material.

4. The vehicle seat according to claim 3, wherein the base line includes:
   a slot that linearly extends along a border between the at least one skin material and the overlapping portion, and
   at least one bridge portion located at an end of the slot and configured to connect the at least one skin material and the overlapping portion.

5. A vehicle seat, comprising:
   a seat cover comprising three panels joined at an intersecting area; and a seat pad with a plurality of recessed grooves intersecting at an intersection point of the intersecting area of the three panels, wherein at least one of the three panels integrally includes an overlapping portion folded underneath the at least one panel such that the overlapping portion is positioned between the seat pad and an outer surface of the seat cover at the intersection area of the seat pad to define a high-rigidity portion of the seat cover, the high-rigidity portion of the at least one panel has a greater rigidity than a rigidity of each of the other two panels, and the high-rigidity portion overlaps the intersection point of the recessed grooves.

6. The vehicle seat according to claim 5, wherein the rigidity of the high-rigidity portion is at least twice the rigidity of a pad material of at least one of the three panels.

7. The vehicle seat according to claim 5, wherein the high-rigidity portion includes a rigid hem overlapping at least one of the three panels.

8. The vehicle seat according to claim 7, wherein the rigid hem overlaps a first seam allowance of one of the panels.

9. The vehicle seat according to claim 7, wherein the hem comprises a linear slot at an end of the hem spaced apart from a seam.

10. The vehicle seat according to claim 9, wherein the linear slot traverses more than half of the end of the hem spaced apart from the seam.

11. The vehicle seat according to claim 9, wherein the linear slot traverses less than half of the end of the hem spaced apart from the seam.

12. The vehicle seat according to claim 7, wherein a side surface of the hem directly contacts a side surface of a second seam allowance in a direction in which the hem overlaps the first seam allowance.

13. The vehicle seat according to claim 5, wherein:
the seat pad includes a corner at the intersection point, the corner having an angle of 90° or less, and
the high rigidity portion overlaps at least a tip of the corner.

14. The vehicle seat according to claim 5, further comprising a second high-rigidity portion position in at least a part of the intersecting area, the second high-rigidity portion being joined to the high-rigidity portion by a seam.

* * * * *